United States Patent
Suzuki et al.

(10) Patent No.: US 9,794,858 B2
(45) Date of Patent: *Oct. 17, 2017

(54) DATA PROCESSING APPARATUS, DATA PROCESSING SYSTEM, AND DATA PROCESSING METHOD

(71) Applicant: FUJITSU LIMITED, Kawasaki-shi, Kanagawa (JP)

(72) Inventors: Takahisa Suzuki, Yokohama (JP); Koichiro Yamashita, Hachioji (JP); Hiromasa Yamauchi, Usakos (NA); Koji Kurihara, Kawasaki (JP); Toshiya Otomo, Kawasaki (JP); Yuta Teranishi, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 60 days.

This patent is subject to a terminal disclaimer.

(21) Appl. No.: 14/603,718

(22) Filed: Jan. 23, 2015

(65) Prior Publication Data

US 2015/0131486 A1 May 14, 2015

Related U.S. Application Data

(63) Continuation of application No. PCT/JP2012/068866, filed on Jul. 25, 2012.

(51) Int. Cl.
*H04W 48/08* (2009.01)
*H04W 8/26* (2009.01)
(Continued)

(52) U.S. Cl.
CPC .......... *H04W 48/08* (2013.01); *H04L 67/12* (2013.01); *H04W 4/023* (2013.01); *H04W 8/26* (2013.01);
(Continued)

(58) Field of Classification Search
None
See application file for complete search history.

(56) References Cited

U.S. PATENT DOCUMENTS 7,020,701 B1 * 3/2006 Gelvin ............... G01D 21/00
250/332
2001/0029529 A1 10/2001 Tachibana et al.
(Continued)

FOREIGN PATENT DOCUMENTS

| JP | 2001-282734 | 10/2001 |
|----|-------------|---------|
| JP | 2003-242653 | 8/2003 |

(Continued)

OTHER PUBLICATIONS

Taiwanese Office Action dated Jul. 30, 2015 in corresponding Taiwanese Patent Application No. 102117718.
(Continued)

*Primary Examiner* — Hassan Kizou
*Assistant Examiner* — Deepa Belur
(74) *Attorney, Agent, or Firm* — Staas & Halsey LLP

(57) ABSTRACT

A data processing apparatus that is installed in plural in an installation area and processes data of each installation site, includes a processor that based on a combination of identification information included in calibration information respectively transmitted by calibration nodes and self-identification generation information that is included in the calibration information and for identifying the data processing apparatus among the plural data processing apparatuses, generates self-identification information; a memory device that retains the self-identification information; and a wireless communications circuit that receives the calibration information from the calibration nodes and performs transmission and reception of the data with an adjacent data processing apparatus provided in the installation area.

11 Claims, 15 Drawing Sheets

(51) Int. Cl.
*H04W 4/02* (2009.01)
*H04W 48/16* (2009.01)
*H04W 24/00* (2009.01)
*H04L 29/08* (2006.01)
*H04W 84/18* (2009.01)
*H04W 4/00* (2009.01)

(52) U.S. Cl.
CPC ......... *H04W 24/00* (2013.01); *H04W 48/16* (2013.01); *H04W 4/001* (2013.01); *H04W 4/006* (2013.01); *H04W 84/18* (2013.01)

(56) References Cited

U.S. PATENT DOCUMENTS

| | | |
|---|---|---|
| 2002/0019725 A1 | 2/2002 | Petite |
| 2003/0061345 A1 | 3/2003 | Kawasaki et al. |
| 2005/0063326 A1* | 3/2005 | Ohkuma ............. H04Q 9/00 370/310 |
| 2006/0023643 A1 | 2/2006 | Lim |
| 2007/0036090 A1 | 2/2007 | Bhatti |
| 2007/0159301 A1* | 7/2007 | Hirt ............. H04W 52/0216 340/10.1 |
| 2007/0198708 A1 | 8/2007 | Moriwaki et al. |
| 2007/0299624 A1 | 12/2007 | Motobayashi et al. |
| 2008/0002606 A1 | 1/2008 | Cheung et al. |
| 2008/0165761 A1* | 7/2008 | Goppner ............. H04B 7/269 370/350 |
| 2008/0215609 A1* | 9/2008 | Cleveland ............. G01D 21/00 |
| 2008/0278769 A1 | 11/2008 | Poirier |
| 2009/0024272 A1* | 1/2009 | Rogers ............. G01B 11/2755 701/31.4 |
| 2009/0201896 A1 | 8/2009 | Davis et al. |
| 2009/0322518 A1* | 12/2009 | Liang ............. H04L 45/48 340/539.18 |
| 2010/0085969 A1 | 4/2010 | Aoki et al. |
| 2010/0124209 A1* | 5/2010 | In ............. H04B 7/2656 370/337 |
| 2010/0318641 A1* | 12/2010 | Bullard ............. H04L 43/065 709/223 |
| 2011/0153865 A1* | 6/2011 | Hong ............. H04L 45/02 709/243 |
| 2012/0059903 A1* | 3/2012 | Kim ............. H04L 67/12 709/217 |
| 2012/0188057 A1* | 7/2012 | Green ............. H04L 67/12 340/8.1 |
| 2013/0182566 A1* | 7/2013 | Goergen ............. H04L 1/1628 370/230 |
| 2013/0184008 A1* | 7/2013 | Terada ............. H04W 24/00 455/456.1 |
| 2013/0188492 A1* | 7/2013 | Gorgen ............. H04L 1/1854 370/235 |
| 2013/0242929 A1 | 9/2013 | Görgen et al. |
| 2013/0276144 A1 | 10/2013 | Hansen et al. |
| 2013/0324165 A1* | 12/2013 | Fujiwara ............. H04W 12/06 455/457 |
| 2014/0026161 A1 | 1/2014 | Zheng et al. |
| 2014/0254433 A1* | 9/2014 | Abe ............. H04W 40/02 370/256 |

FOREIGN PATENT DOCUMENTS

| | | |
|---|---|---|
| JP | 2004-96906 | 3/2004 |
| JP | 2005-204016 | 7/2005 |
| JP | 2006-42370 | 2/2006 |
| JP | 2006-67377 | 3/2006 |
| JP | 2007-174303 | 7/2007 |
| JP | 2008-176502 | 7/2008 |
| JP | 2008-244756 | 10/2008 |
| JP | 2009-5136 | 1/2009 |
| JP | 2009-505445 | 2/2009 |
| JP | 2009-159619 | 7/2009 |
| JP | 2009-188930 | 8/2009 |
| JP | 2009-250627 | 10/2009 |
| JP | 2010-141469 | 6/2010 |
| TW | 200803388 | 1/2008 |
| TW | 201228315 | 7/2012 |
| WO | WO 2008/062724 A1 | 5/2008 |

OTHER PUBLICATIONS

Extended European Search Report dated Jul. 23, 2015 in corresponding European Patent Application No. 12881577.6.
Taiwanese Office Action dated Jul. 30, 2015 in corresponding Taiwanese Patent Application No. 10421014990.
International Search Report dated Oct. 23, 2012, in corresponding International Patent Application No. PCT/JP2012/068866.
Taiwanese Office Action dated Jul. 7, 2015 in corresponding Taiwanese Patent Application No. 103119186.
International Preliminary Report on Patentability dated Aug. 6, 2013 in corresponding International Patent Application No. PCT/JP2013/068447.
International Search Report dated Aug. 6, 2013 in corresponding International Patent Application No. PCT/JP2013/068447.
Japanese Office Action dated Feb. 21, 2017 in corresponding Japanese Patent Application No. 2015-524983.
Non-Final Office Action dated Aug. 11, 2017 in related U.S. Appl. No. 14/979,417 (42 pages).

\* cited by examiner

FIG.8A

| FLAG | IDENTIFI-CATION INFOR-MATION | DISTANCE INFORMATION |

CALIBRATION INFORMATION

FIG.8B

| FLAG | SENSOR NODE IDENTIFICATION INFORMATION | DETECTION INFORMATION |

| IDENTIFI-CATION INFOR-MATION 1 | DISTANCE INFOR-MATION 1 | IDENTIFI-CATION INFOR-MATION 2 | DISTANCE INFOR-MATION 2 | IDENTIFI-CATION INFOR-MATION 3 | DISTANCE INFOR-MATION 3 |

SENSING INFORMATION

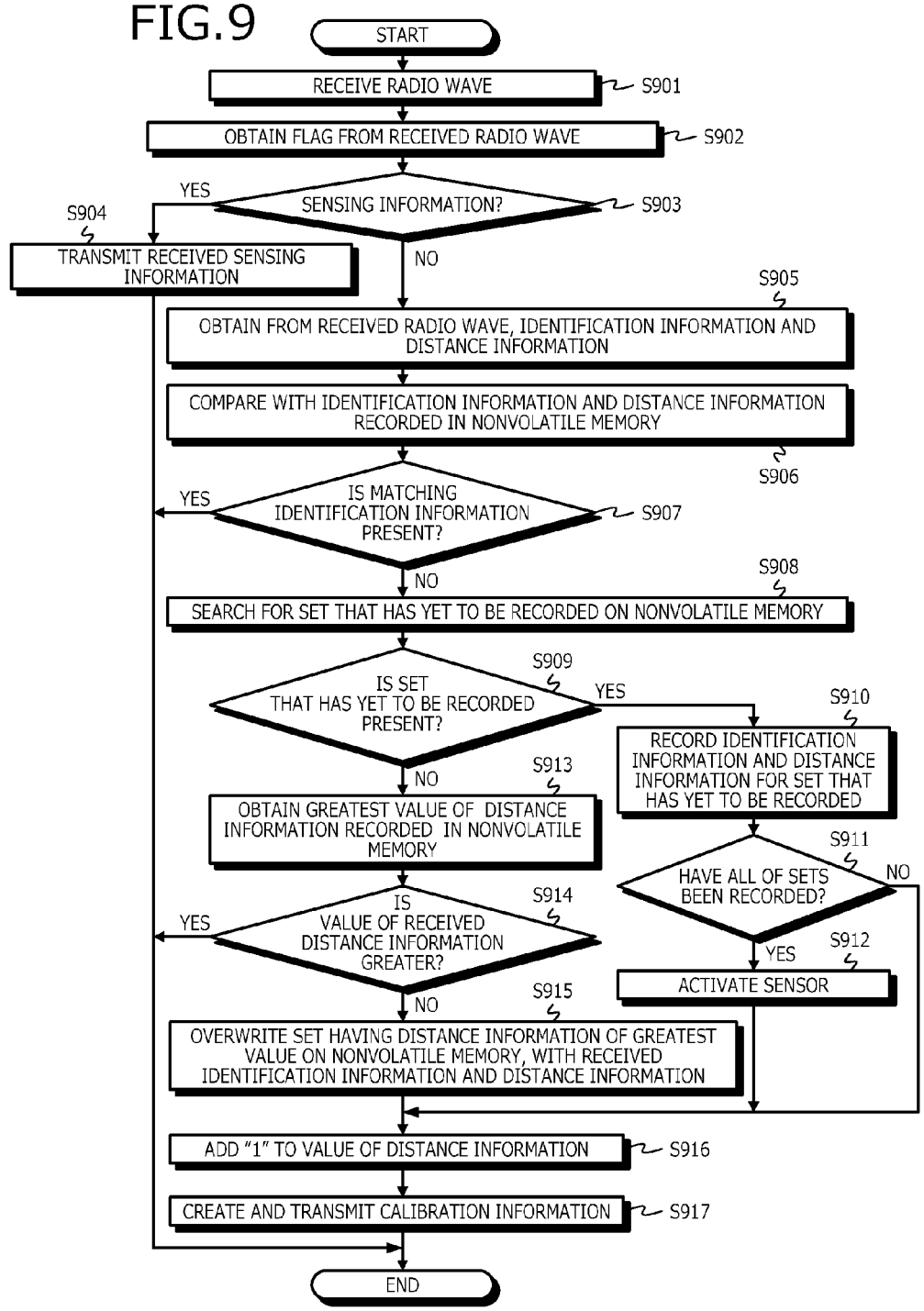

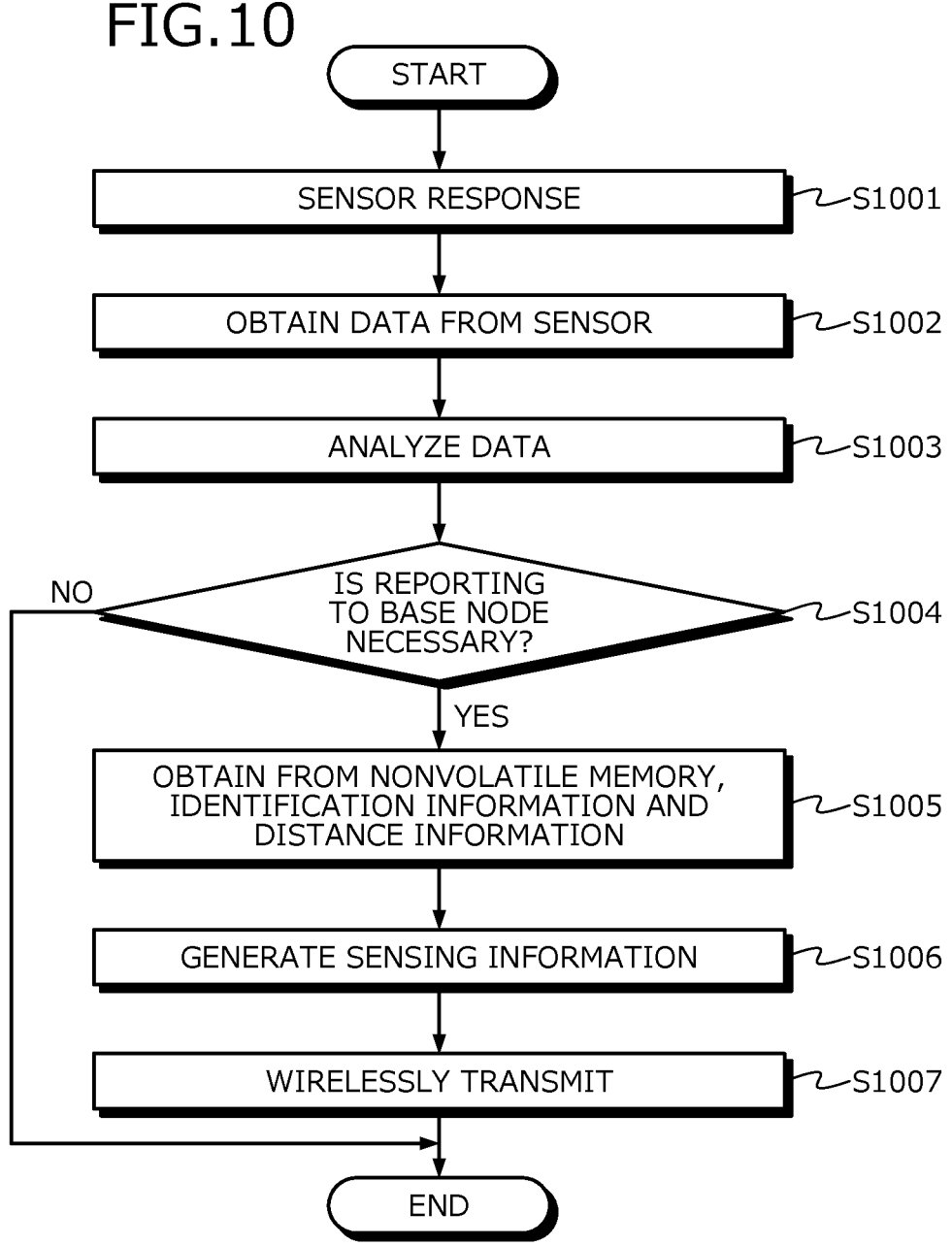

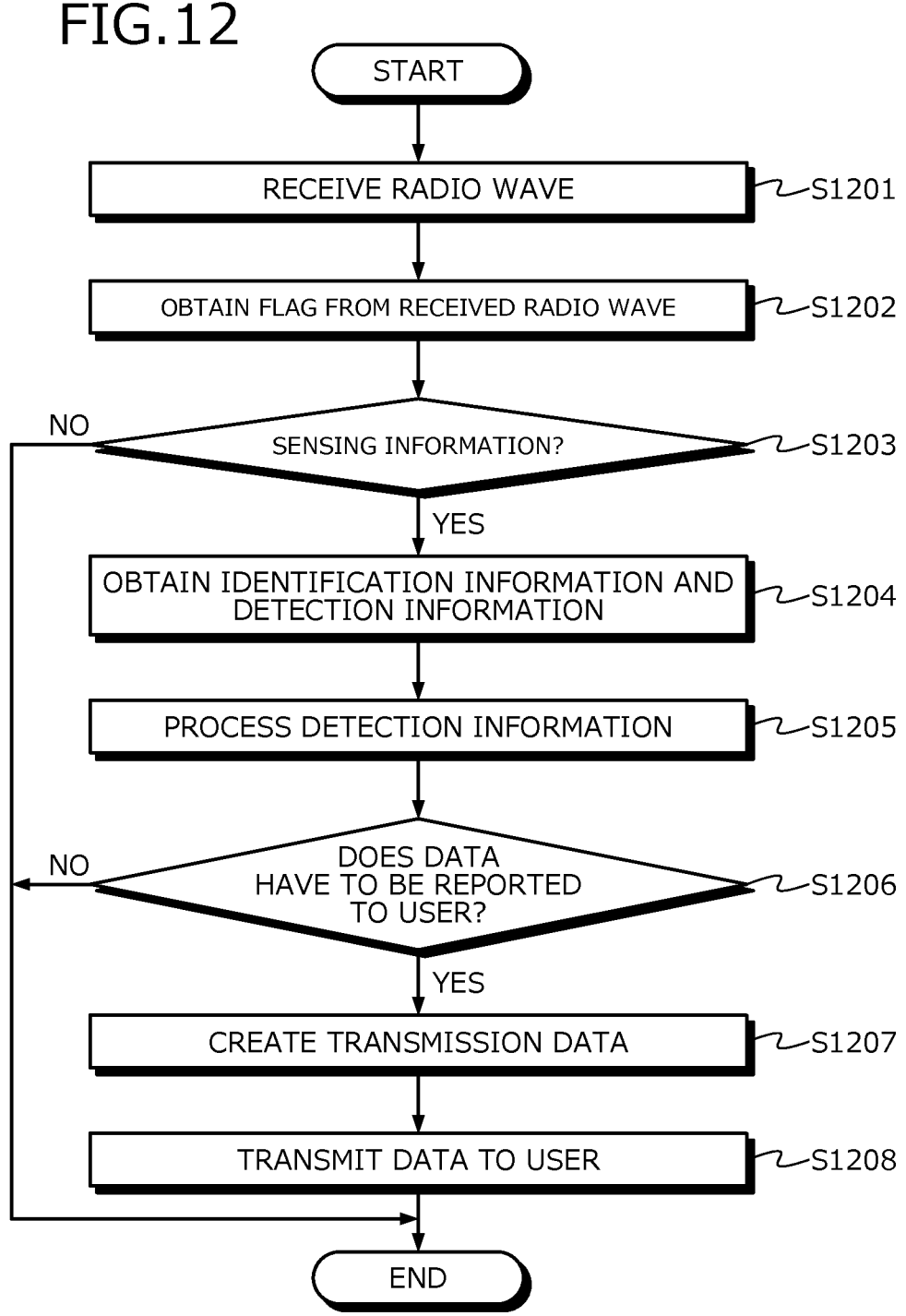

FIG.13A

CALIBRATION
INFORMATION

| FLAG | IDENTIFI-CATION INFOR-MATION |
|---|---|

FIG.13B

CALIBRATION
INFORMATION

| FLAG | IDENTIFI-CATION INFOR-MATION | RADIO WAVE INTENSITY |
|---|---|---|

DATA PROCESSING APPARATUS, DATA PROCESSING SYSTEM, AND DATA PROCESSING METHOD

CROSS REFERENCE TO RELATED APPLICATIONS

This application is a continuation application of International Application PCT/JP2012/068866, filed on Jul. 25, 2012, and designating the U.S., the entire contents of which are incorporated herein by reference.

FIELD

The embodiments discussed herein are related to a data processing apparatus, a data processing system, and a data processing method that process data.

BACKGROUND

Sensor network technology in which numerous sensors are installed in an installation area, detection information obtained by the respective sensors is wirelessly transmitted, and the detection information is collected by a base device that can wirelessly communicate with a sensor in the installation area is conceivable. In such a sensor network, for example, it is further conceivable that it is desirable to monitor temporal changes of the detection information of each sensor. In this case, identification information is set for each sensor and correlated management of the identification information and detection information is necessary.

To set identification information for a sensor, it is conceivable that at the time of manufacture or setting of the sensor, a writing tool such as a read-only memory (ROM) writer is used to set individually unique identification information in a non-volatile area of the ROM in the sensor. However, in cases where there are an extremely large number of sensors, problems arise including the huge amount of work required for such setting, and increased manufacturing and installation costs.

Further, to detect the position of multiple sensors, there is a technique of disposing two sensors to which identification information is respectively given and whose positions are known; and from the communication time that these two sensors to communicate with another sensor, a distance is obtained whereby, the position of each sensor is obtained (for example, refer to Japanese Laid-Open Patent Publication No. 2009-250627). According to another technique, to prevent unauthorized copying of a multilayer optical recording medium, identification information based on the distance between base points of the recording layers is used to identify the multilayer optical recording medium (for example, refer to Japanese Laid-Open Patent Publication No. 2003-242653).

A case is conceivable where a large number, e.g., several hundred to several tens of thousands, of low-cost chip sensors are arranged as a sensor network. In this case, that which improves the function of the sensors and the technical direction differ. The number of sensors is set to a relatively large number according to the degree to which the function of the sensors is curbed and as a result, the volume of detection information that can be detected by the sensor network overall increases.

In this type of simple sensor network that uses a large number of simple-function sensors, the ability to continuously monitor temporal changes of the detection information for each of the sensors, which are of a large number, becomes more important than accurately grasping the positions of the sensors. Additionally, a way to simply set, by using a simple configuration, the identification information of the large number of sensors dispersed throughout the installation area is desirable.

SUMMARY

According to an aspect of an embodiment, a data processing apparatus that is installed in plural in an installation area and processes data of each installation site, includes a processor that based on a combination of identification information included in calibration information respectively transmitted by calibration nodes and self-identification generation information that is included in the calibration information and for identifying the data processing apparatus among the plural data processing apparatuses, generates self-identification information; a memory device that retains the self-identification information; and a wireless communications circuit that receives the calibration information from the calibration nodes and performs transmission and reception of the data with an adjacent data processing apparatus provided in the installation area.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 8A and 8B are diagrams depicting calibration information and sensing information output by a sensor node;

FIG. 9 is a flowchart depicting process details of a calibration process performed by a sensor node according to the first embodiment;

FIG. 10 is a flowchart depicting a process related to transmission of sensing information after sensor activation;

FIG. 12 is a flowchart depicting a process by the base node;

FIGS. 13A and 13B are diagrams depicting calibration information of a second embodiment;

DESCRIPTION OF EMBODIMENTS

Figure 1:
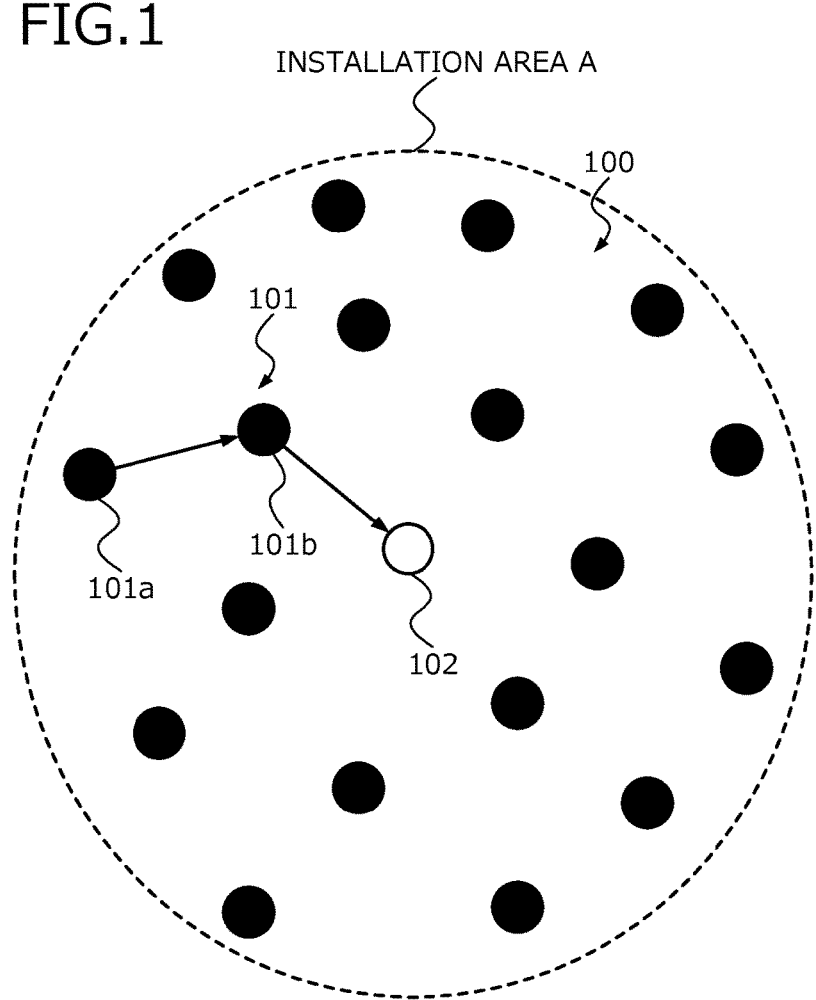
FIG. 1 is a diagram depicting a configuration example of a data processing system that includes a data processing apparatus according to a first embodiment.

Preferred embodiments will be described in detail with reference to the accompanying drawings. FIG. 1 is a diagram depicting a configuration example of a data processing system that includes a data processing apparatus according to a first embodiment. A data processing system 100 depicted in FIG. 1 includes plural chip sensor nodes (data processing apparatuses) 101 arranged in a given installation area A and a base node (data aggregating apparatus) 102 that receives, e.g., wirelessly receives, sensor output of the sensor nodes 101 in the installation area A.

The sensor nodes 101 detect given displacement at each installation site in the installation area A and transmit the detected information to the base node 102, by wireless communication. The base node 102 aggregates the information obtained from the sensor nodes 101 provided in the installation area A, uploads the information to a server (external apparatus), notifies a user terminal (external apparatus) of data of the detection by the sensor nodes 101 at the respective installation sites.

As depicted in FIG. 1, a large number of the sensor nodes 101 (black circles in the drawing) are installed in the installation area A. Further, a single base node 102 (white circle in the drawing) is installed at an arbitrary site in the installation area A. The sensor nodes 101 in the first embodiment suffice to have near field communication capability, to be able to output radio waves that can reach at least an adjacent sensor node 101. Therefore, data of a sensor node 101a that is far from the base node 102 is transferred to the base node 102 through an adjacent sensor node or the sensor node 101b. Data of the detection by the sensor nodes 101 reach the base node 102 by such transfers (refer to arrow in FIG. 1).

Figure 2:
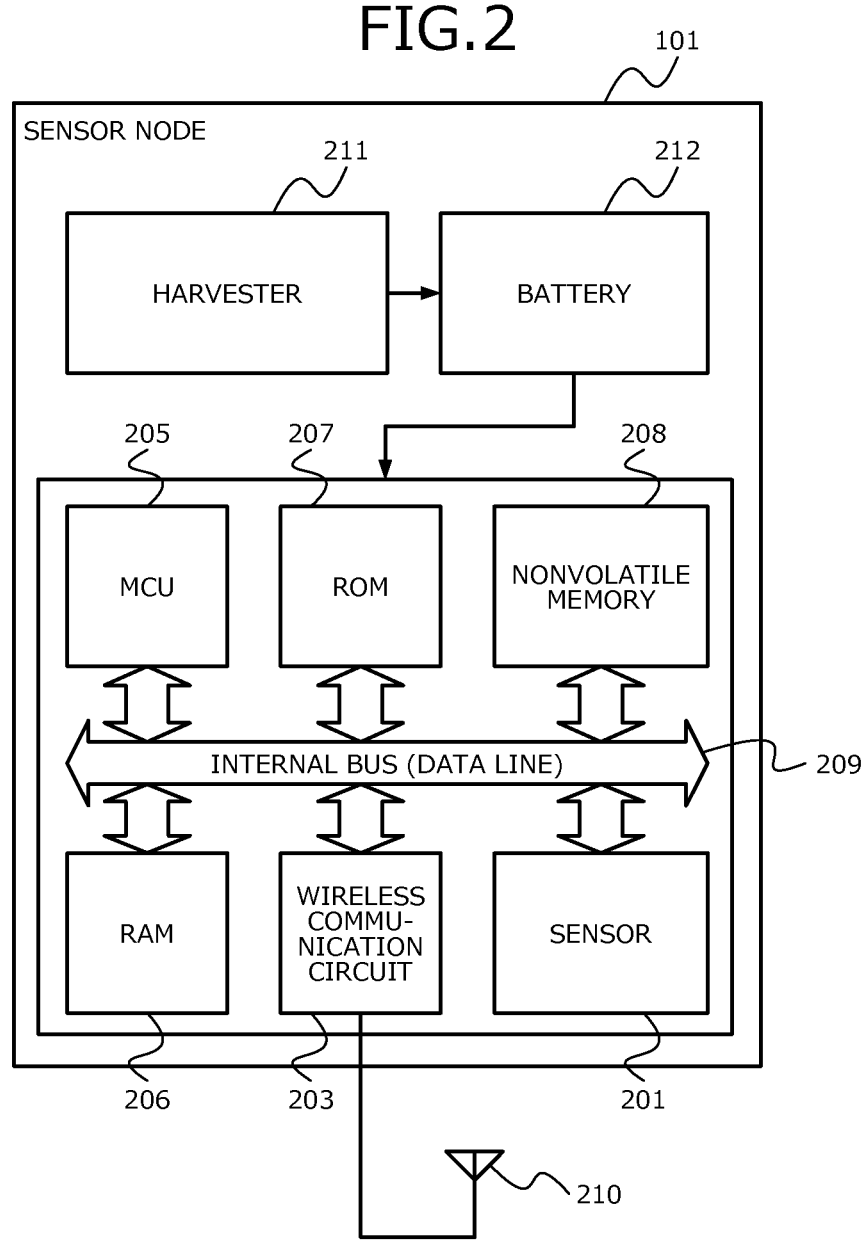
FIG. 2 is a block diagram of an example of an internal configuration of a sensor node.

FIG. 2 is a block diagram of an example of an internal configuration of a sensor node. The sensor node 101, which is the data processing apparatus, includes a sensor 201, wireless communication circuit 203, a microprocessor (micro control unit (MCU)) 205, random access memory (RAM) 206, read-only memory (ROM) 207 retaining data written thereto in advance, nonvolatile memory (memory device) 208 retaining data in a rewritable manner, an antenna 210, a harvester 211, and a battery 212.

The sensor 201 detects given displacement at the installation site. For example, the sensor 201 is a piezoelectric element that detects the pressure at the installation site, an optoelectronic element that detects light, etc. The antenna 210 transmits and receives radio waves for wireless communication with the base node 102. The wireless communication circuit (RF) 203 outputs received radio waves as received signals, and transmits transmission signals as radio waves through the antenna 210.

The microprocessor (MCU) 205 processes data of the detection by the sensor 201. The RAM 206 stores transient data of the processing at the MCU 205. The ROM 207 stores processing programs, etc. executed by the MCU 205. The nonvolatile memory 208 retains given data written thereto, even when the power supply is lost. Further, the sensor 201 to the nonvolatile memory 208 are connected by a bus 209.

The sensor node 101 further includes the harvester 211 and the battery 212. The harvester 211 generates electrical power based on energy changes in the external environment at the installation site of the sensor node 101, e.g., such as changes in light, vibration, temperature, radio waves (received radio waves), etc. The battery 212 stores the electrical power generated by the harvester 211 and supplies the electrical power as a drive power source of the sensor node 101. In other words, the sensor node 101 does not need a secondary battery or an external power source and internally generates power required for operation.

The described nonvolatile memory 208 of the sensor node 101 stores distance information that indicates a distance for which a calibration node 401 (described hereinafter) is assumed as a transmission source (origin). Thus, even when the battery 212 has no power, the nonvolatile memory 208 enables the sensor node 101 to continue to retain the distance information from the calibration node 401.

Figure 3:
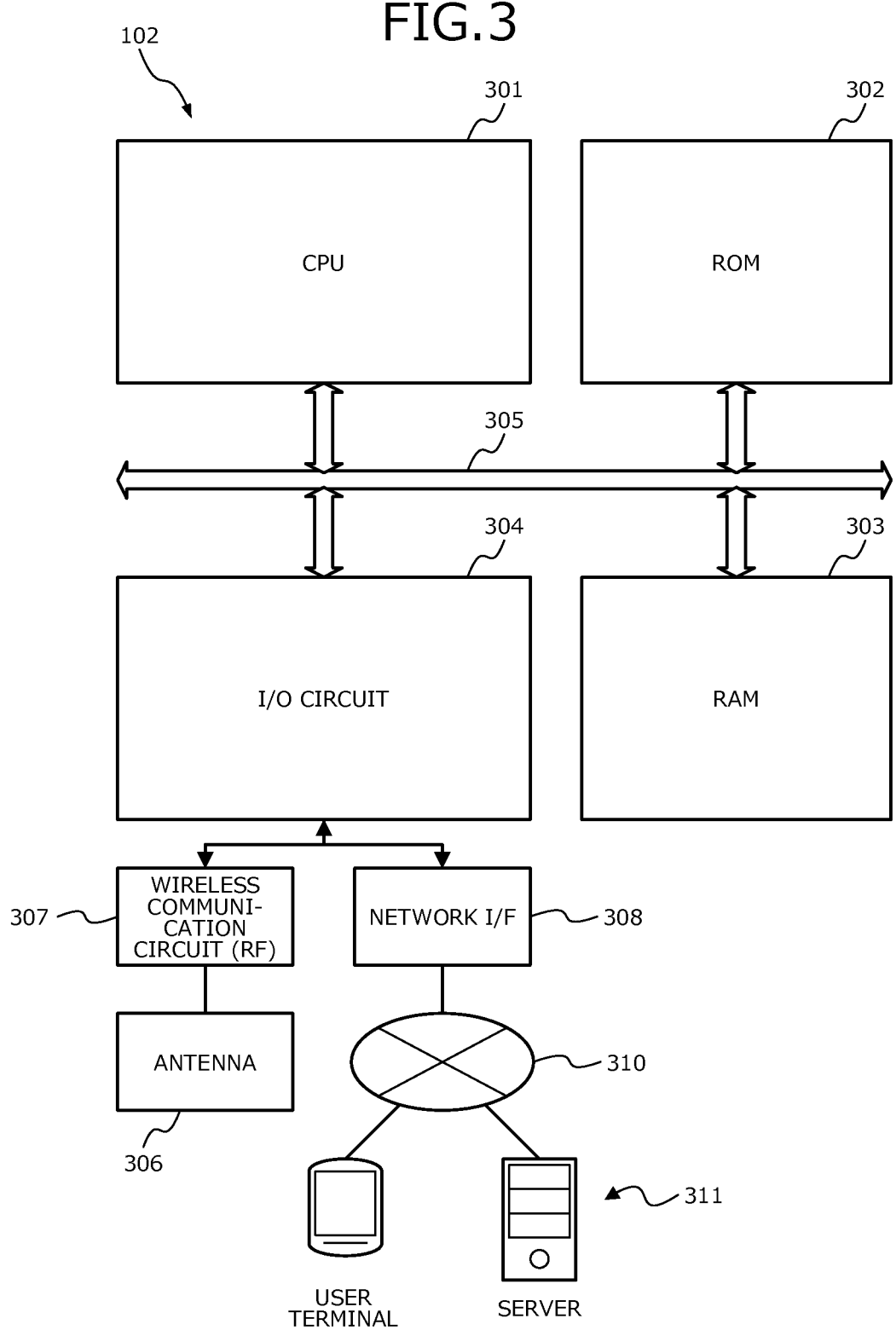
FIG. 3 is a block diagram depicting an example of an internal configuration of a base node.

FIG. 3 is a block diagram depicting an example of an internal configuration of the base node. The base node 102 has a function of aggregating sensing information transmitted from the sensor nodes 101. The base node 102, unlike the sensor nodes 101, does not have a sensor and runs on an external power source. The base node 102 includes a processor (CPU) 301 that is more sophisticated than the processors (MCUs) 205 of the sensor nodes 101, ROM 302 and RAM 303 of a large-capacity, an interface (I/O) circuit 304, and a bus 305 that respectively connects the CPU 301 to the I/O circuit 304.

The I/O circuit 304 is connected to an antenna 306 and a wireless communication circuit (radio frequency (RF)) 307 that are for performing wireless communication with the sensor nodes 101 and is further connected to a network I/F 308, whereby the base node 102 aggregates the sensing information transmitted from the sensor nodes 101. The aggregated sensing information is transmitted to an external apparatus 311 such as a user terminal and a server, via the network I/F 308 and through a network 310 such as the Internet by a TCP/IP protocol process.

Figure 4:
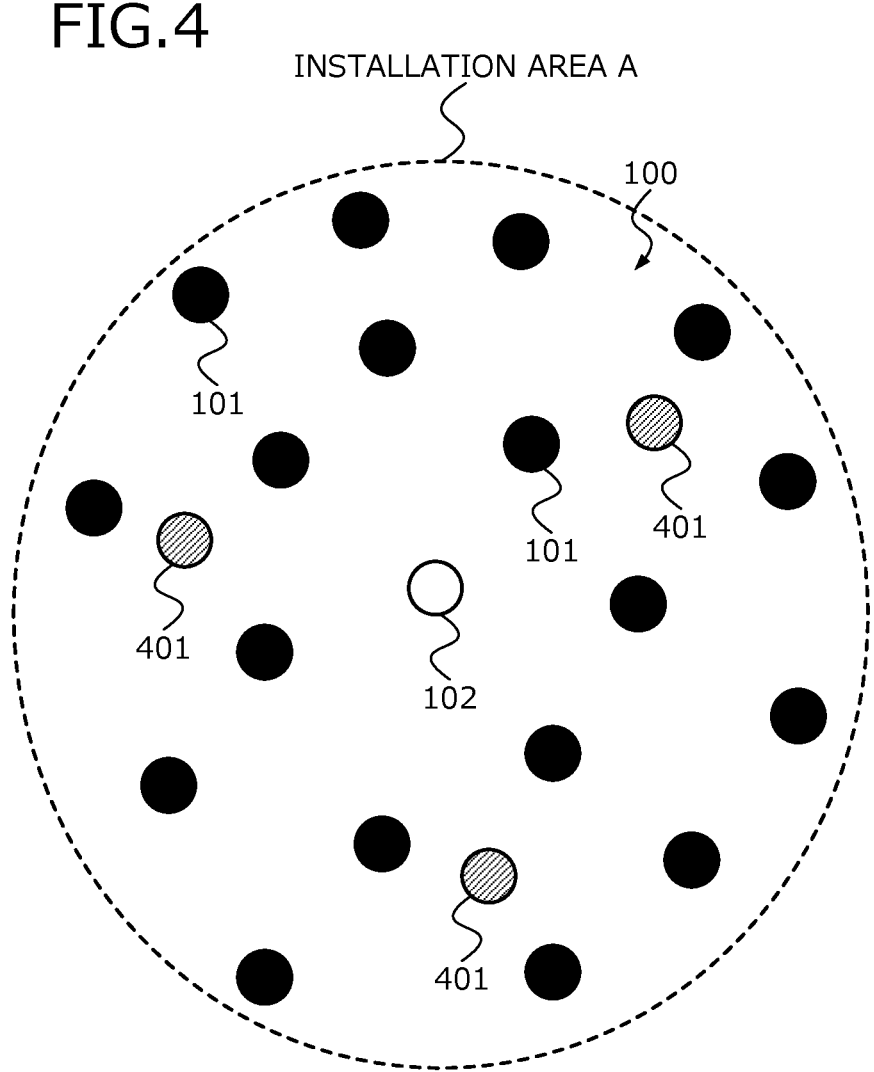
FIG. 4 is a diagram depicting calibration node installation.

FIG. 4 is a diagram depicting calibration node installation. After installation of the sensor nodes 101 and the base node 102 depicted in FIG. 1, the calibration nodes 401 (hatched circles in the figure) are installed, calibration information is wirelessly transmitted from the calibrations node 401, and calibration of the sensor nodes 101 is performed. Calibration of the sensor nodes 101 is a process of giving to each of the sensor nodes 101, individual identification information (self-identification information).

As depicted in FIG. 4, in the calibration, when the installation area A is 2-dimensional (on a plane), three or more of the calibration nodes 401 are used. A manager, etc. installs the calibration nodes 401 at arbitrary locations in the installation area A so that the calibration nodes 401 do not all reside along a straight line and angles are formed among the calibration nodes 401. Further, when the installation area A is 3-dimensional (a solid), four or more of the calibration nodes 401 are used and the calibration nodes 401 are installed at arbitrary locations in the installation area A so that the calibration nodes 401 do not all reside on the same plane. The calibration node 401 has the same configuration as the base node 102 (refer to FIG. 3). The calibration node 401, for example, consequent to user operation or based on an instruction from the external apparatus 311, wirelessly transmits calibration information for the installation area A.

After the sensor nodes 101 have respectively stored the unique identification information and distance information to the nonvolatile memory 208, the manager can remove the calibration nodes 401. Further, provided that there is no change in the number of sensor nodes 101 in the installation area A, even if the sensor nodes 101 move, the sensor nodes 101 retain the unique calibration information (identification information and distance information). On the other hand, in the installation area A, if sensor nodes 101 are replaced or added, the manager can again install the calibration nodes 401 and perform the calibration.

Figure 5:
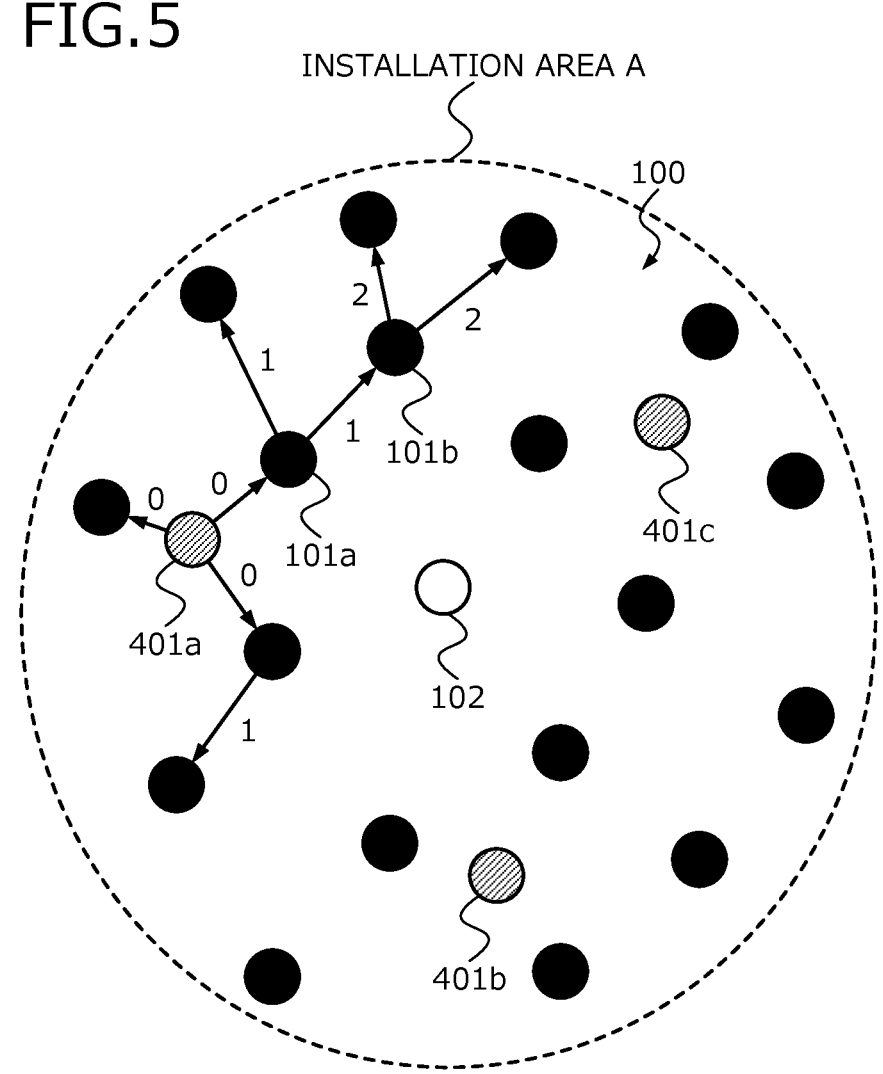
FIG. 5 is a diagram depicting a calibration process of the first embodiment.

FIG. 5 is a diagram depicting a calibration process of the first embodiment. After installation of the calibration nodes 401, the calibration nodes 401 are operated and calibration starts. As depicted in FIG. 5, when calibration starts, each calibration node 401 outputs as calibration information, the identification information and distance information of the calibration node 401. More specifically, each calibration node 401 wirelessly outputs identification information that is unique to the calibration node 401 and stored to the ROM 302 in advance, and the value of "0" as the initial value of the distance information.

The sensor nodes 101 in the vicinity of the calibration node 401 receive the identification information and distance information wirelessly transmitted by the calibration node 401, and store the identification information and distance information of the calibration node 401 to the nonvolatile memory 208. Each sensor node 101 adds "1" to the value of the received distance information and regards the resulting value as the distance information of the sensor node 101. Each sensor node 401 wirelessly outputs to other sensor nodes 101, the distance information resulting from the addition of "1", and the identification information of the calibration node 401.

Similarly, thereafter, between the sensor nodes 101 "1" is added to the distance information, and the distance information and the identification information of the calibration node 401 are transferred. As described above, the distance information assumes the calibration node 401 as the origin "0", and indicates a hop count of the sensor nodes 101 that respectively add "1" to the distance information value when the distance information passes the sensor node 101. Thus, the calibration information is transferred between adjacent sensor nodes 101. Similarly, concerning data processed at the sensor nodes 101, the data is transferred to other sensor nodes 101 that are adjacent to the sensor nodes 101 and consequent to these transfers between the sensor nodes 101, the data can reach the base node 102.

Therefore, the wireless communication circuit 203 of the sensor nodes 101 suffices to have a small wireless output that enables communication with adjacent sensor nodes 101, whereby power savings and size reductions of the chip of the sensor nodes 101 can be achieved.

In the example depicted in FIG. 5, the sensor node 101a adds "1" to the value "0" of the distance information received from the calibration node 401a and wirelessly outputs the value "1" of the distance information. The sensor node 101b adjacent to the sensor node 101a adds "1" to the value "1" of the distance information received from the sensor node 101a and wirelessly outputs the value "2" of the distance information.

Figure 6:
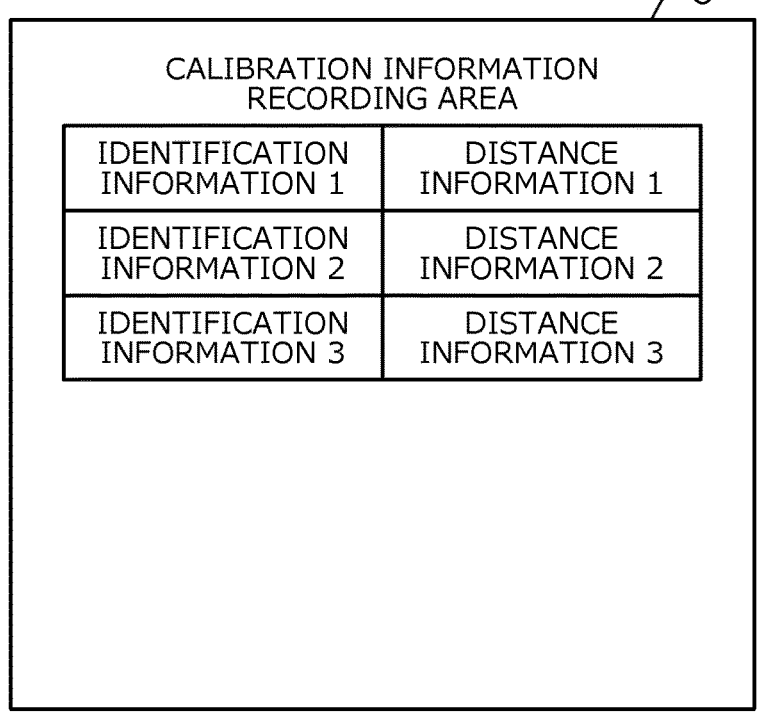
FIG. 6 is a chart depicting information stored in nonvolatile memory of a sensor node.

FIG. 6 is a chart depicting information stored in the nonvolatile memory of a sensor node. In the nonvolatile memory 208 of the sensor node 101, an area is prepared for recording each set of the paired identification information and distance information of the calibration nodes 401 (self-identification generation information for identifying the sensor node). The number of sets to be recorded is 3 as depicted in the drawing, when the installation area A is 2-dimensional and when 3-dimensional, four or more sets are prepared. Calibration nodes 401 equivalent in number to the number of sets to be recorded are assumed to be installed in the installation area A. For example, identification information 1 depicted in FIG. 6 corresponds to the calibration node 401a, identification information 2 corresponds to the calibration node 401b, and identification information 3 corresponds to a calibration node 401c, respectively depicted in FIG. 5.

Each of the sensor nodes 101, upon receiving calibration information (identification information and distance information), records to the nonvolatile memory 208 and in the sequence received, the identification information and distance information of the calibration node 401.

Figure 7:
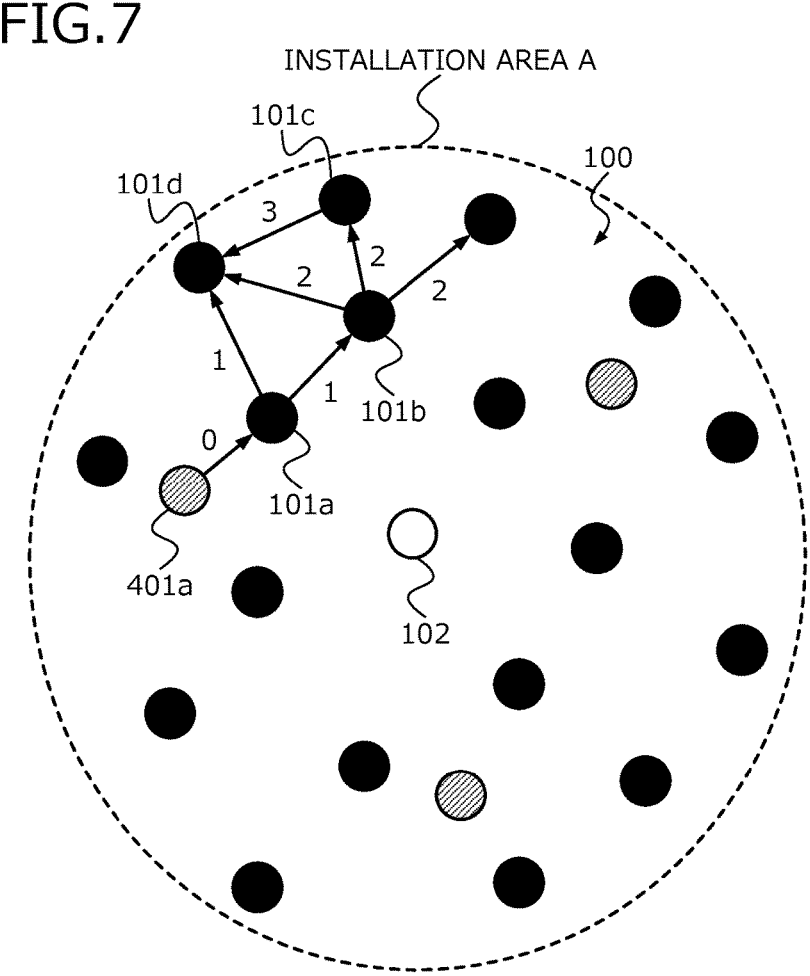
FIG. 7 is a diagram depicting different distance information received by the sensor nodes.

FIG. 7 is a diagram depicting different distance information received by the sensor nodes. The calibration information is transferred by relaying between the sensor nodes 101. Therefore, as depicted in FIG. 7, the relaying between the sensor nodes 101, for example, goes back and forth, and/or loops around and around, whereby information indicating a different distance may arrive at the same sensor node 101.

Therefore, if calibration information arrives that has the same identification information value, the sensor node 101 records only the value received from the node whose distance is short (distance information having a small value). When calibration information is transferred between the sensor nodes 101, the distance to the node that transmitted the calibration information first received is the shortest distance. Therefore, the sensor node 101 having received the calibration information, records to the nonvolatile memory 208, only the calibration information received first. Thereafter, if calibration information having the same identification information (different distance information value) is received, the calibration information is neither recording to the nonvolatile memory 208 nor transferred to other sensor nodes 101.

For example, a sensor node 101d depicted in FIG. 7 has the three sensor nodes 101a, 101b, and 101c as adjacent sensor nodes 101. Therefore, after receiving the distance information of the value "1" from the sensor node 101a, the sensor node 101d receives the value of "2" from the sensor node 101b and thereafter, receives the value "3" from a sensor node 101c. In this case, the sensor node 101d records to the nonvolatile memory 208, only the value of the distance information that arrived first. In this case, the value of the distance information is "1".

Further, if the calibration information that arrives is greater than or equal to the number of sets of identification information and distance information prepared in the nonvolatile memory 208, there is a possibility that calibration information from another installation area A has arrived. In this case, the sensor node 101 preferentially records the calibration information having the shorter distance (distance information having a small value). As a result, in the nonvolatile memory 208, which stores the calibration information, the memory area required can be made to be of a fixed capacity.

The sensor node 101 activates the sensor 201 and starts the sensing operation, after the required number of sets of calibration information (identification information and distance information) of the calibration nodes 401 is complete. When reporting to the base node 102 is required consequent to the sensing operation of the sensor 201, the sensor node 101 wirelessly outputs the information detected by the sensor 201, and the calibration information (identification information and distance information) recorded in the nonvolatile memory 208. This set of identification information and distance information is the identification information of the sensor node 101 that performed the wireless output thereof.

FIGS. 8A and 8B are diagrams depicting calibration information and sensing information output by a sensor node. The calibration information depicted in FIG. 8A includes a flag, identification information, and distance information. The sensing information depicted in FIG. 8B includes a flag, sensor node identification information, and detection information obtained by the sensing operation of the sensor 201. The sensor node identification information depicted in FIG. 8B is an example in a case where the installation area A is 2-dimensional, and includes the identification information 1 to 3 and the distance information 1 to 3 for three calibration nodes 401 (401a to 401c). The identification information and distance information are recorded to the nonvolatile memory 208 at the time of receipt and are read from the nonvolatile memory 208 at the time of transmission.

The calibration information and sensing information respectively have a flag at the head and the sensor node 101 makes the values of the respective flags for calibration and for sensing differ. For example, if the received and transmitted information are (a) calibration information, the sensor node 101 sets the flag=0 and if the information is (b) sensing information, the sensor node 101 changes the flag=1.

FIG. 9 is a flowchart depicting process details of a calibration process performed by a sensor node according to the first embodiment. The process is performed by the MCU 205 of the sensor node 101. The sensor node 101, upon receiving a radio wave (step S901), obtains a flag (refer to FIGS. 8A and 8B) from the received radio wave (step S902). The sensor node 101 determines based on the value of the flag, whether the received information is (a) calibration information or (b) sensing information (step S903).

If the information is sensing information (step S903: YES), the sensor node 101 transmits the received sensing information as is to other sensor nodes 101 (step S904), and terminates the process. On the other hand, if the received information is calibration information (step S903: NO), the sensor node 101 obtains from the received radio wave, the calibration information (identification information and distance information of the calibration node 401) (step S905). The sensor node 101 compares the received calibration information (identification information and distance information) with calibration information (identification information and distance information) recorded in the nonvolatile memory 208 (step S906). The sensor node 101 determines matching identification information of a calibration node 401 is present (step S907). If matching identification information is present (step S907: YES), the sensor node 101 terminates the process.

On the other hand, at step S907, if no matching identification information is present (step S907: NO), the sensor node 101 searches for a set that has yet to be recorded on the nonvolatile memory 208 (step S908). A set that has yet to be recorded, for example, is a set that among sets of the identification information 1 to 3 and the distance information 1 to 3 depicted in FIG. 6, has not been recorded to the nonvolatile memory 208. If a set that has yet to be recorded is present (step S909: YES), the sensor node 101 records the identification information and the distance information for the set that has yet to be recorded (step S910). The sensor node 101 determines whether all of the sets have been recorded (step S911). If all of the sets have been recorded (step S911: YES), the sensor node 101 activates the sensor 201 (step S912), and transitions to step S916. At step S911, if all of the sets have not been recorded (step S911: NO), the sensor node 101 transitions to step S916.

Further, at step S909, if a set that has yet to be recorded is present (step S909: NO), the sensor node 101 obtains the greatest value of the distance information recorded in the nonvolatile memory 208 (step S913), and determines whether the value of the received distance information is greater than the greatest value of the distance information recorded in the nonvolatile memory 208 (step S914). If the value of the received distance information is greater than the greatest value of the distance information recorded in the nonvolatile memory 208 (e.g., "greater than or equal to", step S914: YES), the sensor node 101 terminates the process. On the other hand, if the value of the received distance information is less than the greatest value of the distance information recorded in the nonvolatile memory 208 (e.g., "less than", step S914: NO), the sensor node 101 overwrites the set having the distance information of the greatest value on the nonvolatile memory 208, with the received calibration information (identification information and distance information) (step S915). Consequently, the calibration information (identification information and distance information) unique to the sensor node 101 in the installation area A is recorded in the nonvolatile memory 208.

Thereafter, the sensor node 101 adds "1" to the value of the received distance information (step S916), creates calibration information (refer to FIG. 8A) and transmits the calibration information to other sensor nodes 101 (step S917), and terminates the process. As described, after installation, when the sensor node 101 receives a calibration signal and sets identification information for the sensor node 101, the sensing operation described hereinafter can be executed.

FIG. 10 is a flowchart depicting a process related to transmission of sensing information after sensor activation. A process performed by the sensor nodes 101 after the sensor activation at step S912 in FIG. 9, when the sensor has responded is described.

The MCU 205 of the sensor node 101 obtains data of the detection by the sensor 201 and when the value of this data exceeds a predetermined threshold, determines whether the data has to be reported to the base node 102. If the data has to be reported, the MCU 205 generates and wirelessly transmits sensing information (refer to FIG. 8B).

The sensor node 101, when the sensor 201 indicates a detection response and has output a given value (step S1001), obtains the data of the detection by the sensor 201 (step S1002), and analyzes the data (step S1003).

The sensor node 101, as a result of this data analysis, determines whether reporting to the base node 102 is necessary (step S1004). As described above, for example, if the value of the data of the detection by the sensor 201 exceeds a predetermined threshold, the sensor node 101 determines that reporting is necessary (step S1004: YES), and transitions to step S1005. Further, if the value of the data of the detection by the sensor 201 does not exceed the predetermined threshold, the sensor node 101 determines that reporting is not necessary (step S1004: NO), and terminates the process.

At step S1004, if the value of the data of the detection by the sensor 201 exceeds the predetermined threshold and reporting has been determined to be necessary (step S1004: YES), the sensor node 101 obtains from the nonvolatile memory 208, the sensor node identification information (the identification information 1 to 3 and the distance information 1 to 3) (step S1005). The sensor node 101 generates sensing information that is a combination of the sensor node identification information (the identification information 1 to 3 and the distance information 1 to 3) and the detection information obtained by the sensor 201 (step S1006). The sensor node 101 appends to the generated sensing information, a flag indicating sensing information (refer to FIG. 8B), wirelessly transmits the sensing information from the wireless communication circuit 203 (step S1007), and terminates the process.

Figure 11:
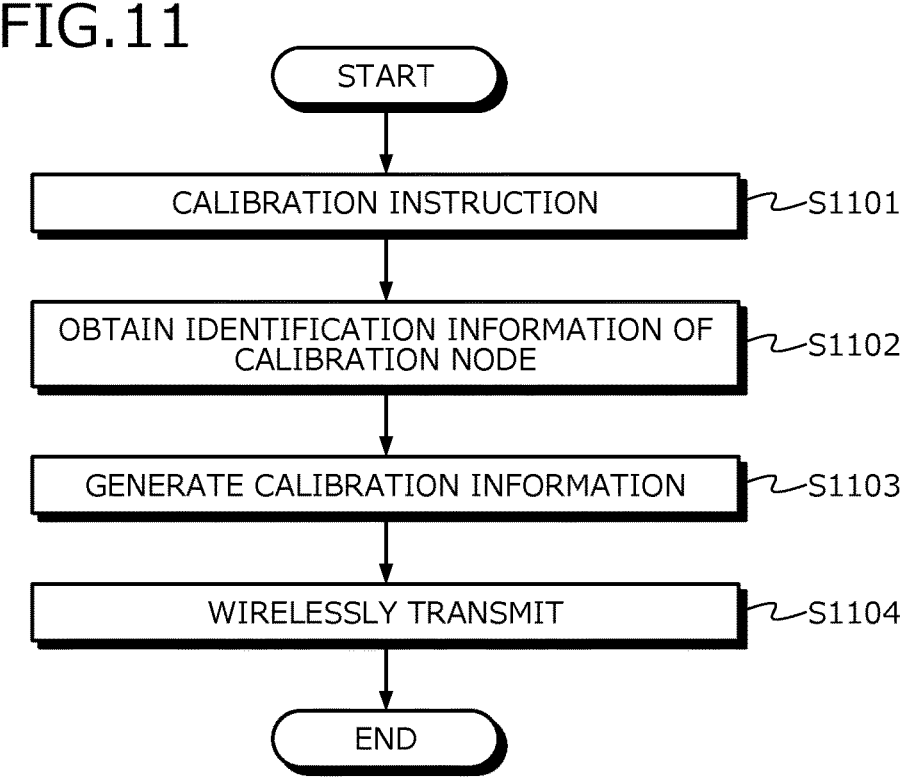
FIG. 11 is a flowchart depicting a process by a calibration node.

FIG. 11 is a flowchart depicting a process by the calibration node. The calibration node 401, upon receiving a calibration instruction (step S1101), obtains the identification information of the calibration node 401 (step S1102). The identification information unique to the calibration node 401 is stored to the ROM 302 in advance and is read out from the ROM 302, or may be included in the calibration instruction at step S1101.

The calibration node 401 generates calibration information from the identification information obtained at step S1102 and the initial value "0" of the distance information (step S1103). The calibration node 401 appends to the generated calibration information, a flag that indicates calibration information (refer to FIG. 8A), wirelessly transmits the calibration information from the wireless communication circuit 307 (step S1104), and terminates the process.

FIG. 12 is a flowchart depicting a process by the base node. When receiving a radio wave from a sensor node 101, if the received data is sensing information, the base node 102 obtains detection information from the sensing information and performs data processing. If the external apparatus 311, such as that of the user or a server, has to be notified via the Internet, the base node 102 transmits the data through the network 310.

Upon receiving a radio wave from the sensor node 101 (step S1201), the base node 102 obtains the flag from the received radio wave (step S1202). More specifically, from the flag appended to the data, the base node 102 determines whether the data is the calibration information depicted in FIG. 8A or the sensing information depicted in FIG. 8B (step S1203). If the flag indicates the calibration information (e.g., flag=0) (step S1203: NO), the base node 102 terminates the process. On the other hand, if the flag indicates the sensing information (e.g., flag=1) (step S1203: YES), the base node 102 obtains the identification information and the detection information included in the sensing information (step S1204). From the identification information included in the sensing information, the sensor node 101 that corresponds to the detection information can be identified.

The base node 102 data-processes the detection information included in the sensing information and thereby, data-processes the detection information of the identified sensor node 101 (step S1205). If the value after the data processing indicates an abnormal value such as when the value exceeds a given threshold, or if the value is a periodically monitored value, the base node 102 determines whether the data has to be reported to the user (step S1206). If the data does not have to be reported to the user (step S1206: NO), the base node 102 terminates the process.

On the other hand, if the data has to be reported to the user (step S1206: YES), the base node 102 creates transmission data that is of a given format and transmitted to the user (step S1207). The base node 102 transmits the data to the external apparatus 331, such as a user terminal or server, by transmitting the created transmission data via the network 310 (step S1208), and terminates the process.

According to the first embodiment described above, when numerous sensor nodes are arranged in an installation area, the sensor nodes can be identified by using multiple calibration nodes and the base node can identify the detection information of the respective sensor nodes and data process the detection information. Identification of the respective sensor nodes can be achieved by simply providing calibration information by transferring the calibration information among the sensor nodes after installation in an installation area, without the need to provide identification information before installation.

Further, the sensor nodes are configured to store the calibration information (identification information) to nonvolatile memory and therefore, once the identification information has been provided, the identification information can be retained continuously without being affected by changes in the power supply or cuts in the power supply at the sensor nodes. Consequently, the base node can consistently identify the detection information of the respective sensor nodes and data process the information.

Further, the calibration nodes can be removed by the manager after the identification information has been provided to the sensor nodes. After the provision of the identification information for the sensor nodes installed in an installation area, the calibration nodes can be removed by the manager, moved to another installation area, and used to provide identification information for sensor nodes in the other installation area.

A second embodiment will be described. In the second embodiment, the calibration nodes 401 transmit the calibration information by long-distance communication by which radio waves reach the installation area A overall. From the quality of the radio waves, the intensity of the radio waves received by the sensor nodes 101, i.e., the electromotive force of the radio waves received by the sensor nodes 101 weakens in proportion to the square of the distance from the calibration node 401. Therefore, the sensor nodes 101 estimate the distance from the calibration node 401 based on the intensity of the received radio wave.

FIGS. 13A and 13B are diagrams depicting calibration information of the second embodiment. As depicted in FIG. 13A, the calibration node 401 transmits, as the calibration information, a radio wave that includes a flag and identification information. Further, FIG. 13B depicts the calibration information stored in the nonvolatile memory 208 of the sensor nodes 101. The sensor nodes 101 detect and store to the nonvolatile memory 208, the flag, the identification information of the calibration node 401, and the intensity of the radio wave wirelessly transmitted from the calibration node 401.

Further, if the calibration information that arrives is greater than or equal to the number of sets of identification information prepared in the nonvolatile memory 208, there is a possibility that calibration information from another installation area A has arrived. In this case, the sensor nodes 101 preferentially record the calibration information having the shorter distance (radio wave intensity is high).

Thus, in the second embodiment, the sensor nodes 101 utilize the fact that the intensities of the radio waved received from the calibration nodes 401 differ and each sensor node uses the radio wave intensity as self-identification generation information to identify itself. Therefore, in the second embodiment, the distance information of the first embodiment is not used. Further, in the second embodiment, the transfer of the calibration information between adjacent sensor nodes 101 as described in the calibration process above and the distance information (process of adding the value of "1") at the sensor nodes 101 can be made unnecessary.

Figure 14:
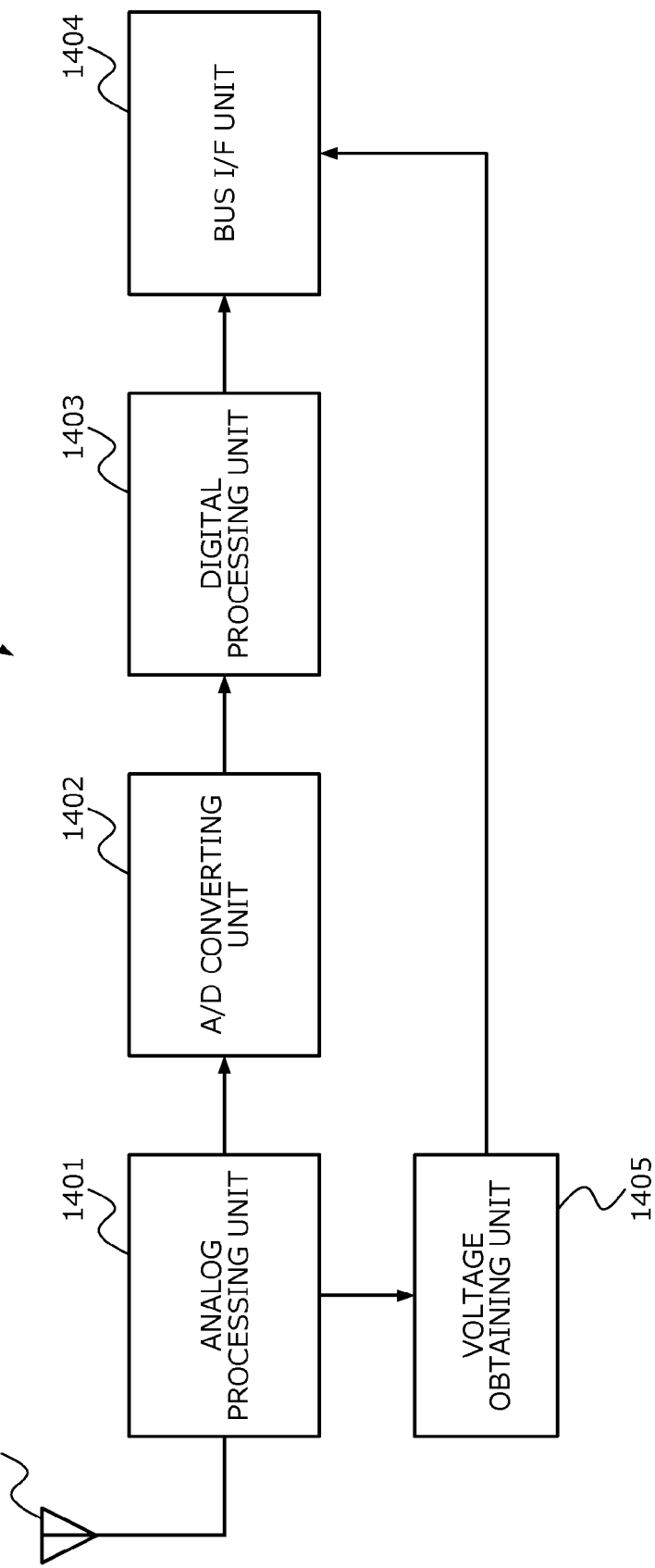
FIG. 14 is a diagram depicting a configuration of a wireless communication circuit for obtaining radio wave intensity at a sensor node.

FIG. 14 is a diagram depicting a configuration of the wireless communication circuit for obtaining the radio wave intensity at a sensor node. In the wireless communication circuit 203 depicted in FIG. 2, an example of an internal configuration for obtaining the radio wave intensity will be described.

The wireless communication circuit 203 includes an analog processing unit 1401, an A/D converting unit 1402, a digital processing unit 1403, a bus I/F unit 1404, and a voltage obtaining unit 1405. The analog processing unit 1401 subjects radio waves received by the antenna 202 to a filter process, demodulation process, amplification process, etc. and outputs to the A/D converting unit 1402, data from which unnecessary signal components such as noise have been removed. The A/D converting unit 1402 converts the analog data into digital data. The digital processing unit 1403 performs digital processing such as error correction after the digital conversion. After being subject to the digital processing, the data is read by the MCU 205 via the bus I/F unit 1404 and the bus 209 (refer to FIG. 2).

As the radio wave intensity, the amplitude (maximum voltage of signal wave) of the analog electronic signal from which noise has been removed and that has been subject to a filter process or a demodulation process by the analog processing unit 1401, is measured and obtained by the voltage obtaining unit 1405. The voltage obtaining unit 1405 includes a non-depicted A/D converting unit, converts the obtained voltage value into a digital value, and outputs the digital value to the bus I/F unit 1404. The voltage (digital value) that corresponds to the measured radio wave intensity can be read by the MCU 205 via the bus I/F unit 1404 and the bus 209.

The voltage measured by the voltage obtaining unit 1405 may be a voltage value after given amplification by the analog processing unit 1401. In this case, the voltage obtaining unit 1405 can obtain from the analog processing unit 1401, the gain at the analog processing unit 1401 and divide the measured voltage by the gain. The amplitude (voltage) of the electronic signal at the antenna 202 consequent to the received radio wave corresponds to the radio wave intensity and therefore, the voltage obtaining unit 1405 uses the voltage obtained from the analog processing unit 1401, as the radio wave intensity.

Figure 15:
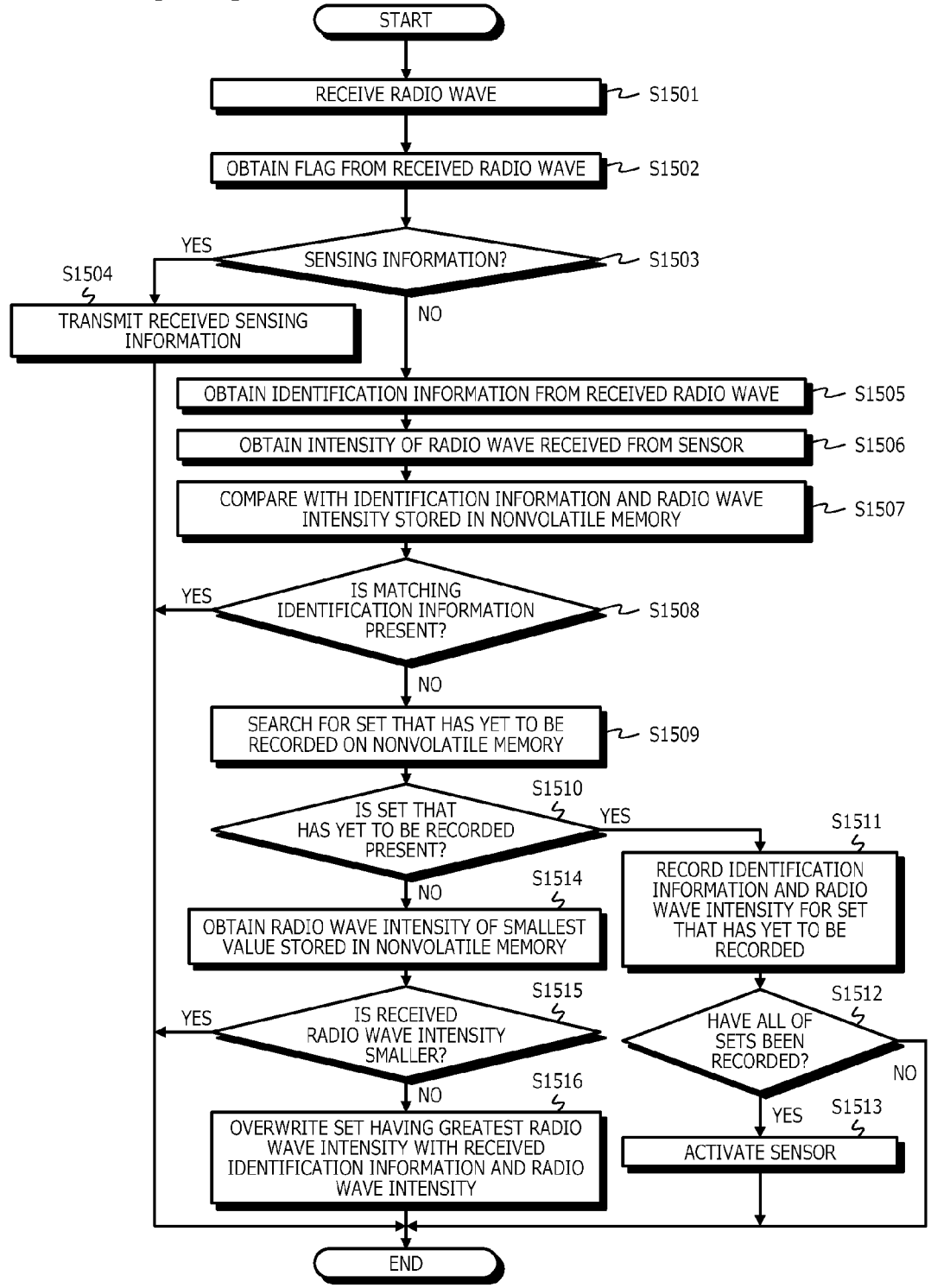
FIG. 15 is a flowchart depicting process details of a calibration process performed by the sensor nodes according to the second embodiment.

FIG. 15 is a flowchart depicting process details of the calibration process performed by the sensor nodes according to the second embodiment. The following process is performed by the MCU 205 of the sensor nodes 101. As described above, in the second embodiment, distance information is not included in the calibration information or the sensing information. The sensor node 101, upon receiving a radio wave (step S1501), obtains a flag (refer to FIGS. 8A and 8B) from the received radio wave (step S1502). The sensor node 101 determines whether the received information is (a) calibration information or (b) sensing information (step S1503).

If the received information is sensing information (step S1503: YES), the sensor node 101 transmits the received sensing information as is to other sensor nodes 101 (step S1504), and terminates the process. On the other hand, if the received information is calibration information (step S1503: NO), the sensor node 101 obtains calibration information (the identification information of the calibration node 401) from the received radio wave (step S1505).

The sensor node 101 obtains the radio wave intensity of the radio wave received from the sensor 201 (step S1506). The sensor node 101 compares the received calibration information (identification information and radio wave intensity) with the calibration information (identification information and radio wave intensity) stored in the nonvolatile memory 208 (step S1507). The sensor node 101 determines whether matching identification information of a calibration node 401 is present (step S1508). If matching identification information is present (step S1508: YES), the sensor node 101 terminates the process.

On the other hand, at step S1508, if no matching identification information is present (step S1508: NO), the sensor node 101 searches for a set that has yet to be recorded on the nonvolatile memory 208 (step S1509). If a set that has yet to be recorded is present (step S1510), the sensor node 101 records the identification information and the radio wave intensity for the set that has yet to be recorded (step S1511). The sensor node 101 determines whether all of the sets have been recorded (step S1512). If all of the sets have been recorded (step S1512: YES), the sensor node 101 activates the sensor 201 (step S1513), and terminates the process. At step S1512, if all of the sets have not been recorded (step S1512: NO), the sensor node 101 terminates the process.

Further, at step S1510, if no set that has yet to be recorded is present (step S1510: NO), the sensor node 101 obtains the radio wave intensity of the smallest value stored in the nonvolatile memory 208 (step S1514), determines whether the received radio wave intensity is smaller than the radio wave intensity of the smallest value stored in the nonvolatile memory 208 (step S1515). If the received radio wave intensity is smaller (e.g., "less than", step S1515: YES), the sensor node 101 terminates the process. On the other hand, if the received radio wave intensity is greater (e.g., "greater than or equal to", step S1515: NO), the sensor node 101 overwrites the set having the greatest radio wave intensity on the nonvolatile memory 208 with the received calibration information (identification information and radio wave intensity) (step S1516), and terminates the process. Thus, the calibration information (identification information and radio wave intensity) unique to the sensor node 101 in the installation area A is recorded in the nonvolatile memory 208.

In the second embodiment, the same effects as the first embodiment are achieved. In addition, according to the second embodiment, the sensor nodes receive the identification information and the radio wave intensity directly from the calibration node, as the calibration information. Therefore, each sensor node can obtain the identification information of the sensor node. Consequently, in the second embodiment, the transfer of the calibration information (distance information) between the sensor nodes can be made unnecessary and the addition process for the distance information value at the time of transfer is unnecessary. As a result, each sensor node can easily and autonomously obtain the identification information of the sensor node.

According to the embodiments, when the positions of the sensor nodes are close, the adjacent sensor nodes may have identification information (in the first embodiment, distance information; in the second embodiment, radio wave intensity) of identical values. Nonetheless, if the sensor nodes are at positions that are close, the data of the detection by the internal sensors are also of close values. At the base node, even if sensing information from sensor nodes of the same identification information is assumed to be received, the processing of either sensing information (or of both) suffices without a need to perform different processing.

Further, by merely performing the calibration process immediately before the sensing operation by the sensor nodes, identification information can be provided to the sensor nodes, which are of a large number, in the installation area. The calibration process suffices to include the installation of movable calibration nodes and the wireless transmission of calibration information. Further, for the sensing operation and the calibration process, the sensor node merely changes the flag and performs the same wireless transmission. Therefore, identification information for each sensor node can be set without burden and at a low cost by a simple procedure without a need to provide any particular position detection means to the sensor node.

In particular, by an application to a sensor network in which several hundred to several tens of thousands of simple-function sensor nodes are installed in an installation area and a base node collects a huge volume of the sensing information from the numerous sensor nodes, the setting of identification information for the numerous sensor nodes can be performed simply. In the embodiments, although the precise position of the sensor nodes cannot be detected, based on identification information that can identify the respective sensor nodes, temporal changes in the detection information of the sensor nodes can be continuously monitored. As a result, a sensor network that collects a huge volume of detection information from numerous simple-function sensor nodes can be built easily.

In the embodiments, without the provision of identification information in advance, the sensor nodes receive calibration information transmitted from the calibration nodes and generate identification information. In general, at the base node (data aggregating apparatus) side, the identification of the position of a subordinate node (sensor node) requires measurement of the distance between the subordinate node and the base node. After which, data is exchanged with the base node or as with the management apparatus of Japanese Laid-Open Patent Publication No. 2009-250627, a mechanism that aggregates the data of the base node is provided, distance information from plural base nodes is aggregated, and the position of the subordinate node is identified. Here, if multiple subordinate nodes are present and there is no information identifying the respective subordinate nodes, at the base node, the positions of the subordinate nodes cannot be identified by aggregating the distance information. Therefore, for example, in Japanese Laid-Open Patent Publication No. 2009-250627 (paragraphs), the subordinate node sends ID identification information and records the identification information of the subordinate node and the distance to the base node. Therefore, conventionally, including the technique of Japanese Laid-Open Patent Publication No. 2009-250627, identification information has to be set for the subordinate nodes by some method, in advance. In contrast, the embodiments do not simply take the process (recited in Japanese Laid-Open Patent Publication No. 2009-250627) of identifying the positions of the subordinate nodes from the base node side and put the process on the subordinate node side, where each subordinate node identifies and records the position thereof. In the embodiments, the sensor nodes receive calibration information transmitted from the calibration nodes and generate the identification information, making the provision of identification information to the sensor nodes in advance unnecessary.

In the embodiments, a sensor network in which detection information obtained by the sensor nodes is transmitted to the base node is described. The disclosed technology is not limited to application to the detection output of a sensor and is applicable in general to data processing in which identification information is appended to data processed at a sensor node; and based on the identification information, a base node identifies the sensor node that transmitted the data. Furthermore, the disclosed technology is applicable to a network in which data from the base device (corresponds to the base node) and to which identification information is appended, is transmitted to multiple nodes (corresponds to the sensor nodes).

According to one embodiment, in a data processing apparatus network that collects a huge volume of data processed by simple-function data processing apparatuses of a large number, identification information of the respective data processing apparatus can be set post hoc.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data processing apparatus that is installed in plural in an installation area and processes data of each installation site, the data processing apparatus comprising:
   a processor that generates self-identification information for identifying the data processing apparatus among a plurality of data processing apparatuses;
   a memory device that retains the generated self-identification information; and
   a wireless communications circuit that receives calibration information used to generate the self-identification information for identifying the data processing apparatus, from a plurality of calibration nodes and performs transmission and reception of data with an adjacent data processing apparatus among the plurality of data processing apparatuses provided in the installation area,
   wherein
   the calibration information received from a calibration node, from among the calibration nodes, includes a combination of sets of paired calibration node identification information identifying the calibration node and distance information indicating a distance of the data processing apparatus from the calibration node.

2. The data processing apparatus according to claim 1, wherein
   the data processing apparatus transmits by the wireless communications circuit, a radio wave to reach the adjacent data processing apparatus and transfer the calibration information and the data to the adjacent data processing apparatus, and
   the processor:
      generates the self-identification information based on the distance indicating a first hop count from the calibration node when the calibration information is received by the data processing apparatus, and
      transfer to the adjacent data processing apparatus, the calibration information that includes a second hop count generated according to an incremented first hop count based upon the transfer performed by the data processing apparatus to the adjacent data processing apparatus as the distance from the calibration node.

3. The data processing apparatus according to claim 2, wherein the processor, when the calibration node identification information of the calibration information received on multiple occasions is identical and distances as hop counts differ, generates the self-identification information based on a hop count that is smaller.

4. The data processing apparatus according to claim 1, wherein
the data processing apparatus receives, from each of the plurality of calibration nodes, a first radio wave to reach the installation area and includes the calibration node identification information thereof in the calibration information,
the plurality of data processing apparatuses transmit by the wireless communications circuit, a second radio wave to reach the adjacent data processing apparatus and transfer the data to the adjacent data processing apparatus, and
the processor generates the self-identification information from a combination of the calibration node identification information that is of the plurality of calibration nodes and included in the calibration information, and a radio wave intensity of the first radio wave.

5. The data processing apparatus according to claim 1, wherein the processor appends the self-identification information to the processed data and transmits the processed data to the adjacent data processing apparatus.

6. The data processing apparatus according to claim 1, further comprising
a sensor that detects a displacement at the installation site, wherein
the processor data-processes the displacement detected by the sensor.

7. The data processing apparatus according to claim 6, wherein the processor, when the displacement detected by the sensor exceeds a given threshold, transmits the processed data to the adjacent data processing apparatus.

8. A data processing system in which a plurality of data processing apparatuses are provided in an installation area and that processes data of each installation site and transmits the processed data to a data aggregating apparatus, the data processing system comprising:
a plurality of calibration nodes that are temporarily installed at mutually different positions to provide self-identification information to the plurality of data processing apparatuses for respectively identifying the plurality of data processing apparatuses and that each transmit to the installation area, calibration information that includes calibration node identification information, respectively identifying a calibration node among the plurality of calibration nodes, and distance information to indicate a distance of the calibration node from each of the plurality of data processing apparatuses; and
a data processing apparatus among the plurality of data processing apparatuses includes:
a wireless communications circuit that receives the calibration information from the plurality of calibration nodes and performs transmission and reception of data with an adjacent data processing apparatus among the plurality of data processing apparatuses provided in the installation area,
a processor that generates the self-identification information based upon the calibration information received from a calibration node, from among the calibration nodes,
the calibration information including a combination of sets of paired calibration node identification information identifying the calibration node and distance information indicating a distance of the data processing apparatus from the calibration node, and
a memory device that retains the generated self-identification information.

9. The data processing system according to claim 8, wherein the plurality of data processing apparatuses transmit by the wireless communications circuit, a radio wave to reach the adjacent data processing apparatus and through the adjacent data processing apparatus, transfer and transmit the data to the data aggregating apparatus.

10. A data processing method of installing a plurality of data processing apparatuses in an installation area, processing data of each installation site, and transmitting the data to a data aggregating apparatus, the data processing method comprising:
to provide self-identification information to the plurality of data processing apparatuses for respectively identifying the plurality of data processing apparatuses:
installing a plurality of calibration nodes that each transmit to the installation area, calibration information that includes calibration node identification information, respectively identifying a calibration node among the plurality of calibration nodes, and distance information to indicate a distance of the calibration node from each of the data processing apparatuses;
by a data processing apparatus among the plurality of data processing apparatuses,
generating the self-identification information based upon the calibration information received from a calibration node, from among the calibration nodes,
the calibration information including a combination of sets of paired calibration node identification information identifying the calibration node and distance information indicating a distance of the data processing apparatus from the calibration node, and
retaining the generated self-identification information in a memory device.

11. The data processing method according to claim 10, wherein the plurality of data processing apparatuses, after generating the self-identification information, append the self-identification information to the processed data and transmit the processed data to the data aggregating apparatus.

* * * * *